US011204067B2

(12) United States Patent
Landrieve

(10) Patent No.: US 11,204,067 B2
(45) Date of Patent: Dec. 21, 2021

(54) BEARING WITH DISTANCE SENSORS AND TAPERED GROOVES

(71) Applicant: Aktiebolaget SKF, Gothenburg (SE)

(72) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/087,168

(22) Filed: Nov. 2, 2020

(65) Prior Publication Data

US 2021/0148408 A1 May 20, 2021

(30) Foreign Application Priority Data

Nov. 19, 2019 (DE) .......................... 102019217789.1

(51) Int. Cl.
| | | |
|---|---|---|
| *F16C 19/38* | (2006.01) | |
| *F16C 33/58* | (2006.01) | |
| *G01M 13/04* | (2019.01) | |
| *F16C 41/00* | (2006.01) | |

(52) U.S. Cl.
CPC ............ *F16C 41/00* (2013.01); *F16C 19/381* (2013.01); *F16C 33/585* (2013.01); *G01M 13/04* (2013.01); *F16C 2233/00* (2013.01); *F16C 2300/14* (2013.01)

(58) Field of Classification Search
CPC ........ F16C 17/24; F16C 19/381; F16C 19/52; F16C 41/007; F16C 43/00; F16C 33/586; F16C 33/60; F16C 3/7896; F16C 2300/14; F16C 2352/00; F16C 41/00
USPC ................ 384/448, 456, 561, 564, 565, 619
See application file for complete search history.

(56) References Cited

U.S. PATENT DOCUMENTS

| | | | | |
|---|---|---|---|---|
| 4,798,299 | A | * | 1/1989 | Bayer ..................... B66C 23/84 212/282 |
| 5,971,619 | A | * | 10/1999 | Bourgeois-Jacquet ..................... F16C 19/166 384/448 |
| 6,119,504 | A | * | 9/2000 | Claus ...................... F16C 19/16 116/208 |
| 10,041,545 | B2 | | 8/2018 | Nicolas et al. |
| 2006/0245677 | A1 | * | 11/2006 | Kenworthy ........... F16C 19/522 384/448 |
| 2008/0008410 | A1 | * | 1/2008 | Adachi ................... G01P 3/443 384/448 |

(Continued)

FOREIGN PATENT DOCUMENTS

| | | | | |
|---|---|---|---|---|
| CA | 2884602 | A1 * | 9/2015 | ............ F16C 41/004 |
| DE | 102015219167 | A1 * | 4/2017 | ............ F16C 41/007 |
| EP | 0814338 | B1 * | 8/2003 | ............ F16C 41/007 |

(Continued)

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

The bearing provides a first ring and a second ring capable of rotating concentrically relative to one another. At least first and second tapered grooves are formed on the second ring and are oriented towards the first ring. The bearing further provides at least one first distance sensor mounted on the first ring and facing a tapered wall of the first tapered groove of the second ring, and at least one second distance sensor mounted on the first ring and facing a tapered wall of the second tapered groove of the second ring, the tapered walls of the first and second grooves extending obliquely along two opposite directions.

10 Claims, 5 Drawing Sheets

(56) References Cited

U.S. PATENT DOCUMENTS

2009/0256551 A1    10/2009  Ito et al.

FOREIGN PATENT DOCUMENTS

| EP | 1653079 A2 | * | 5/2006 | ............ G01P 3/443 |
| EP | 1528356 B1 | * | 1/2015 | ............ G01M 13/04 |
| FR | 3041396 A1 |   | 3/2017 |  |
| WO | 2010/028630 A1 |   | 3/2010 |  |

* cited by examiner

BEARING WITH DISTANCE SENSORS AND TAPERED GROOVES

CROSS-REFERENCE TO RELATED APPLICATIONS

This application claims priority to German Patent Application no. 102019217789.1, filed Nov. 19, 2019, the contents of which is fully incorporated herein by reference.

TECHNICAL FIELD OF THE INVENTION

The present invention relates to the field of bearings. The invention notably relates to the field of large-diameter rolling bearings that can accommodate axial and radial loads, and having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine.

A large-diameter rolling bearing comprises two concentric inner and outer rings, and at least two rows of rolling elements, such as rollers, arranged between the rings. Such rolling bearings are generally loaded both axially and radially, often with relatively large loads. In this case, reference is made to an orientation roller bearing or slewing roller bearing.

As a result of heavy loads, parts of the rolling bearing, more particularly raceways of the rolling elements, wear out. The wear of the rings and rolling elements leads to a significant increase of the initial bearing clearance. The wear exceeding a certain value can lead to a dramatic bearing failure.

Measuring the wear of the bearing through the clearance increase causing relative axial and radial displacement of the rings helps to predict bearing's residual life.

Such unwanted movements affect to proper functioning of the bearing and the application, with the risk that the bearing rings come in contact and collide. Other elements attached to the bearing rings may also collide.

It is common to replace the bearings when they are worn out. Such maintenance interventions are expensive, especially because of the downtime need for the machines or facilities. It is therefore desirable that such maintenance interventions are timely performed before any contact between the bearing rings, but not too early too.

In order to monitor the bearing condition during its service life, the rolling bearing disclosed in patent application FR-A1-3 041 396 comprises an annular magnetic target fixed to the inner ring, and a sensor mounted on the outer ring and facing the magnetic target. Accordingly, axial and angular relative movements between the inner and outer rings can be detected.

However, this requires the installation of the annular magnetic target on the inner ring that can be several meters diameters.

Besides, with the use of such magnetic target, measurement of the axial displacement between the inner and outer rings is affected by the radial one. As a matter of fact, when measuring axial displacement of a magnetic target, the airgap between target and sensor varies with the radial relative movement between the rings making measure less accurate or even impossible.

One aim of the present invention is to overcome these drawbacks.

SUMMARY OF THE INVENTION

The invention relates to a bearing comprising a first ring and a second ring capable of rotating concentrically relative to one another.

According to a general feature, at least a first tapered groove and at least a second tapered groove are formed on the second ring and are oriented towards the first ring.

According to another general feature, the bearing further comprises at least one first distance sensor mounted on the first ring and facing a tapered wall of the first tapered groove of the second ring which is inclined with respect to the axis of the bearing. A longitudinal axis of the first distance sensor is perpendicular to the tapered wall of the first tapered groove.

According to another general feature, the bearing also comprises at least one second distance sensor mounted on the first ring and facing a tapered wall of the second tapered groove of the second ring which is inclined with respect to the axis of the bearing. A longitudinal axis of the second distance sensor is perpendicular to the tapered wall of the second tapered groove.

The tapered walls of the first and second grooves extend obliquely along two opposite directions.

Thanks to the invention, axial and radial relative displacements between the rings can be accurately detected. As a matter of fact, the combination of the signals of the at least two distance sensors allows to calculate these axial and radial relative displacements. Besides, since each of the first and second distance sensors detects a surface perpendicular to its longitudinal axis, the sensitivity and linearity of the measurements are improved.

Otherwise, there is no need to mount an annular magnetic target on one of the rings. The first and second grooves may be easily machined on the associated ring.

The tapered wall of each tapered groove may be a tapered bottom of the groove or any other tapered portion of the groove.

Preferably, each of the first and second tapered grooves of the second ring is annular. Thus, axial and radial relative displacement between the rings can be detected regardless the rotational position of the rings.

In one embodiment, the tapered wall of the second tapered groove is at least partly symmetric to the tapered wall of the first tapered groove with respect to a radial plane of the bearing.

Advantageously, the second tapered groove may extend axially from the first tapered groove. Accordingly, the machining of the first and second groove may be obtained in one single operation.

In one embodiment, the tapered wall of the second tapered groove may extend the tapered wall of the first tapered groove.

In one embodiment, the first ring comprises a single through-hole inside which the first and second distance sensors are at least partly disposed. Advantageously, the bearing may further comprise a casing supporting the first and second distance sensors and mounted inside the through-hole of the first ring.

Accordingly, the first and second distance sensors may be firstly mounted on the casing and then inserted into the associated through-hole and arranged in their final position in an easy way. Preferably, the casing seals the through-hole.

The through-hole of the first ring may extend radially from an axial cylindrical surface located radially on the side opposite to the second ring, and opens on an opposite axial cylindrical surface of the first ring radially facing the second ring.

Advantageously, the bearing further comprises a control unit connected to the first and second distance sensors and adapted to calculate the value of a relative axial displacement Da and a relative radial displacement Dr between the first and second rings on the basis of the formulae:

$$Da = \frac{(\Delta S_{24} - b \times \Delta S_{25})}{(\sin \beta + b \times \sin \alpha)}$$

$$Dr = \frac{(\Delta S_{24} + a \times \Delta S_{25})}{(\cos \beta + a \times \cos \alpha)}$$

Where:
$\Delta S_{24}$ is the value of the differential measurement of the first distance sensor on the tapered wall of the first tapered groove,
$\Delta S_{25}$ is the value of the differential measurement of the second distance sensor on the tapered wall of the second tapered groove,
$\beta$ is the value of a first taper angle of the tapered wall of the first groove,
$\alpha$ is the value of a second taper angle of the tapered wall of the second groove, and $$a = \frac{\sin \beta}{\sin \alpha} \text{ and } b = \frac{\cos \beta}{\cos \alpha}$$

In one embodiment, the first and second taper angles of the tapered walls of the first and second groove are different.

In an alternative embodiment, the tapered walls may have equal first and second taper angles. In this case, the relative axial displacement Da and the relative radial displacement Dr between the first and second rings can be calculated on the basis of the formulae:

$$Da = \frac{(\Delta S_{24} - \Delta S_{25})}{2 \times \sin \beta}$$

$$Dr = \frac{(\Delta S_{24} + \Delta S_{25})}{2 \times \cos \beta}$$

Where:
$\beta$ is the value of the first and second taper angles of the tapered walls of the first and second grooves.

The control unit may be located remote from the components of the bearing. Alternatively, the control unit could be mounted on one of the components of the bearing, for example the first or second ring.

In one embodiment, the first and second distance sensors are spaced apart from one another in the circumferential direction.

In one embodiment, the bearing further comprises at least one row of rolling elements arranged between raceways provided on the first and second rings.

The bearing further may comprise first and second seals disposed between the first and second rings and delimiting together a closed rolling space inside which the row of rolling elements and the first and second distance sensors are housed.

In one embodiment, the bearing may further comprise at least one additional seal located inside the closed rolling space and delimiting together with one of the first and second seals a closed detection space inside which opens the first and second tapered grooves.

In one embodiment, the bearing comprises at least one row of axial rolling elements arranged between radial raceways provided on the rings, and at least one row of radial rolling elements arranged between axial raceways provided on the rings, the second ring comprising a protruding nose engaged into an annular groove of the first ring and which protrudes from an axial surface of the second ring. The axial raceway of the second ring may be formed onto the second axial cylindrical surface.

Preferably, the first and second tapered grooves are formed onto the axial cylindrical surface of the second ring from which protrudes the nose.

The terms "axial rolling elements" is understood to mean rolling elements adapted to accommodate axial loads whereas the terms "radial rolling elements" is understood to mean rolling elements adapted to accommodate radial loads.

The nose of the second ring may be further provided with two opposite radial flanks delimiting axially the axial cylindrical surface, one of the radial flanks delimiting at least partly the radial raceway of the second ring.

In one embodiment, the bearing comprises at least two rows of axial rolling elements each arranged between radial raceways provided on the rings, the two rows of axial rolling elements being disposed axially on each side of the nose of the second ring.

In one embodiment, the first and/or the second distance sensors may be non-contact measurement sensors, i.e. proximity sensors, for example inductive sensors, ultrasonic sensors, or optical sensors.

BRIEF DESCRIPTION OF THE DRAWINGS

The present invention and its advantages will be better understood by studying the detailed description of a specific embodiment given by way of a non-limiting example and illustrated by the appended drawings on which.

DETAILED DESCRIPTION OF THE INVENTION

Figure 1:
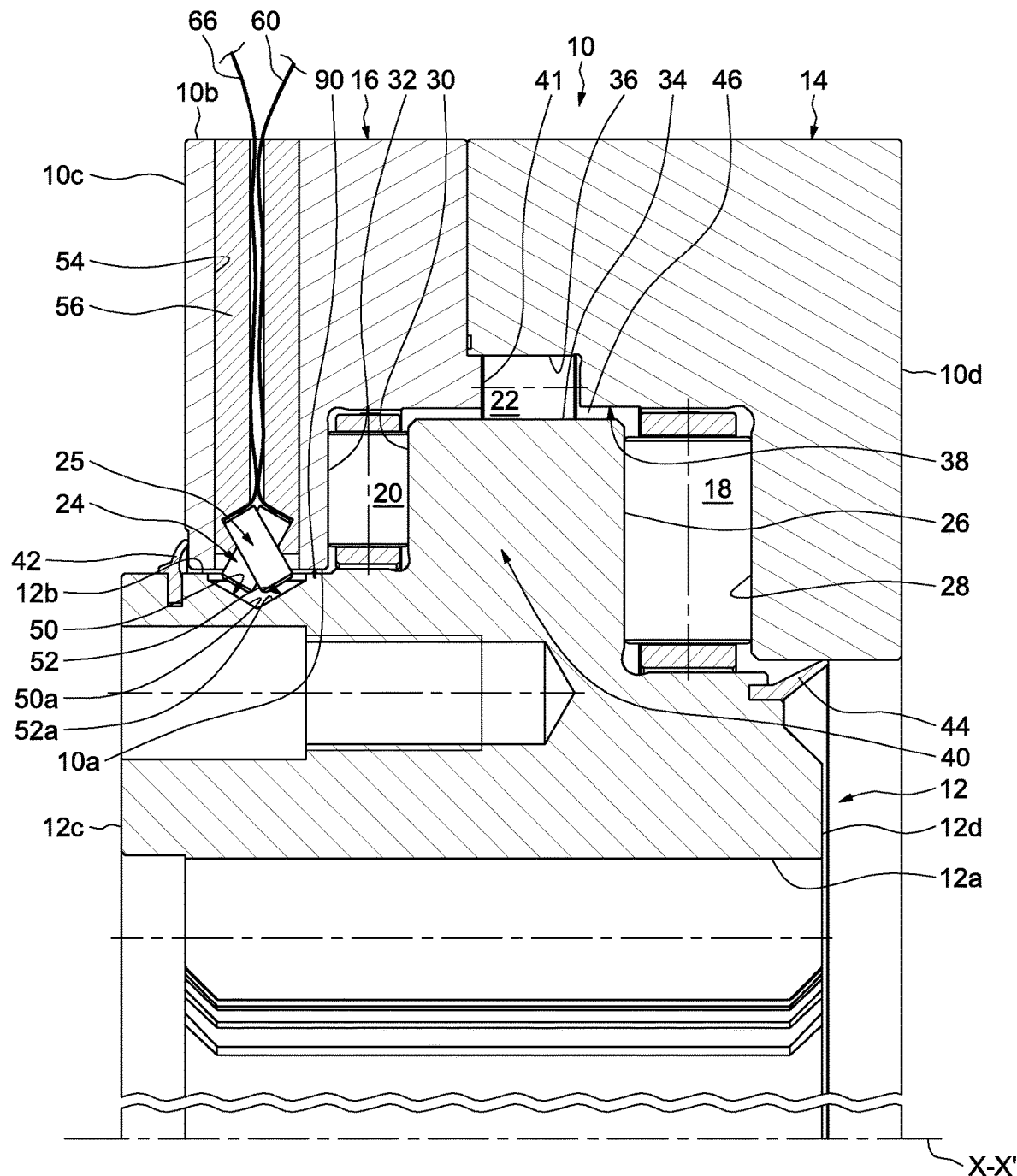
FIG. 1 is a partial cross-section of a rolling bearing according to a first example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises first and second distance sensors 24, 25 for detecting axial and radial relative displacements between the outer and inner rings 10, 12. In the illustrated example, the sensors 24, 25 are mounted on the outer ring 10.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each or the rollers 18, 20. In the illustrated example, the axial length of the rollers 18 is larger than the one of the rollers 20. Alternatively, the axial length of the rollers 18 may be smaller than, or may be equal to, the one of the rollers 20.

The rollers 18 are arranged axially between annular radial raceways 26, 28 respectively formed on the inner and outer rings 12, 10. Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10. Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10a from which the groove 38 is formed. The outer ring 10 also comprises an outer cylindrical surface 10b which is radially opposite to the bore 10a. The outer ring 10 further comprises two opposite radial frontal surfaces 10c, 10d which axially delimit the bore 10a and the outer surface 10b of the ring.

The inner ring 12 comprises an annular protruding nose 40 engaging into the annular groove 38 of the outer ring. The nose 40 extends radially outwards.

The inner ring 12 comprises an inner cylindrical bore 12a and a stepped outer cylindrical surface 12b which is radially opposite to the bore 12a. In the illustrated example, the bore 12a of the inner ring is provided with a gear teeth (not referenced). The inner ring 12 further comprises two opposite radial frontal surfaces 12c, 12d which axially delimit the bore 12a and the outer cylindrical surface 12b. The protruding nose 40 protrudes radially from the outer cylindrical surface 12b.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12b of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimits the radial raceway 28 for the rollers 18. A second flank of the nose 40 and a facing second flank of the groove 38 respectively delimits the radial raceways 30, 32 for the rollers 20. The opposite first and second flanks of the nose 40 delimit axially the nose. Similarly, the opposite first and second flanks of the groove 38 delimit axially the groove. Each of the first and second flanks of the nose 40 extends radially the outer cylindrical surface 12b of the inner ring.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. The outer cylindrical surface of the nose 40 and the outer cylindrical surface 12b are radially offset. As a result, the axial raceway 34 and the outer cylindrical surface 12b are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

The rolling bearing further comprises on each side an annular seal 42, 44 mounted on the inner ring 12 and provided to close the radial space that exists between the rings 10, 12. This radial space is defined between the bore 10a of the outer ring, and the outer cylindrical surface 12b and the outer surface of the nose 40 of the inner ring.

A closed space 46 is defined between the inner and outer ring 12, 14 and the seals 42, 44 in which the rows of rolling elements 18, 20 and 22, and the first and second distance sensors 24, 25 are housed.

Each seal 42, 44 is mounted into a groove (not referenced) formed on the outer cylindrical surface 12b of the inner ring and comes into contact with the outer ring 10. The seal 42 comes into contact with the radial frontal surface 10c of the outer ring. The seal 44 comes into contact with the bore 10a of the outer ring axially near the row of rollers 18. Alternatively, it could be possible to provide a reversed arrangement for at least one of the seals 42, 44 with the seal mounted on the outer ring 10 and coming into friction contact with the inner ring 12.

As previously mentioned, the first and second distance sensors 24, 25 are provided to detect axial and radial relative displacements between the outer and inner rings 10, 12. To this end, first and second annular tapered grooves 50, 52 are also formed on the inner ring 12. In the illustrated example, the grooves 50, 52 are formed on the outer cylindrical surface 12b of the inner ring.

Figure 2:
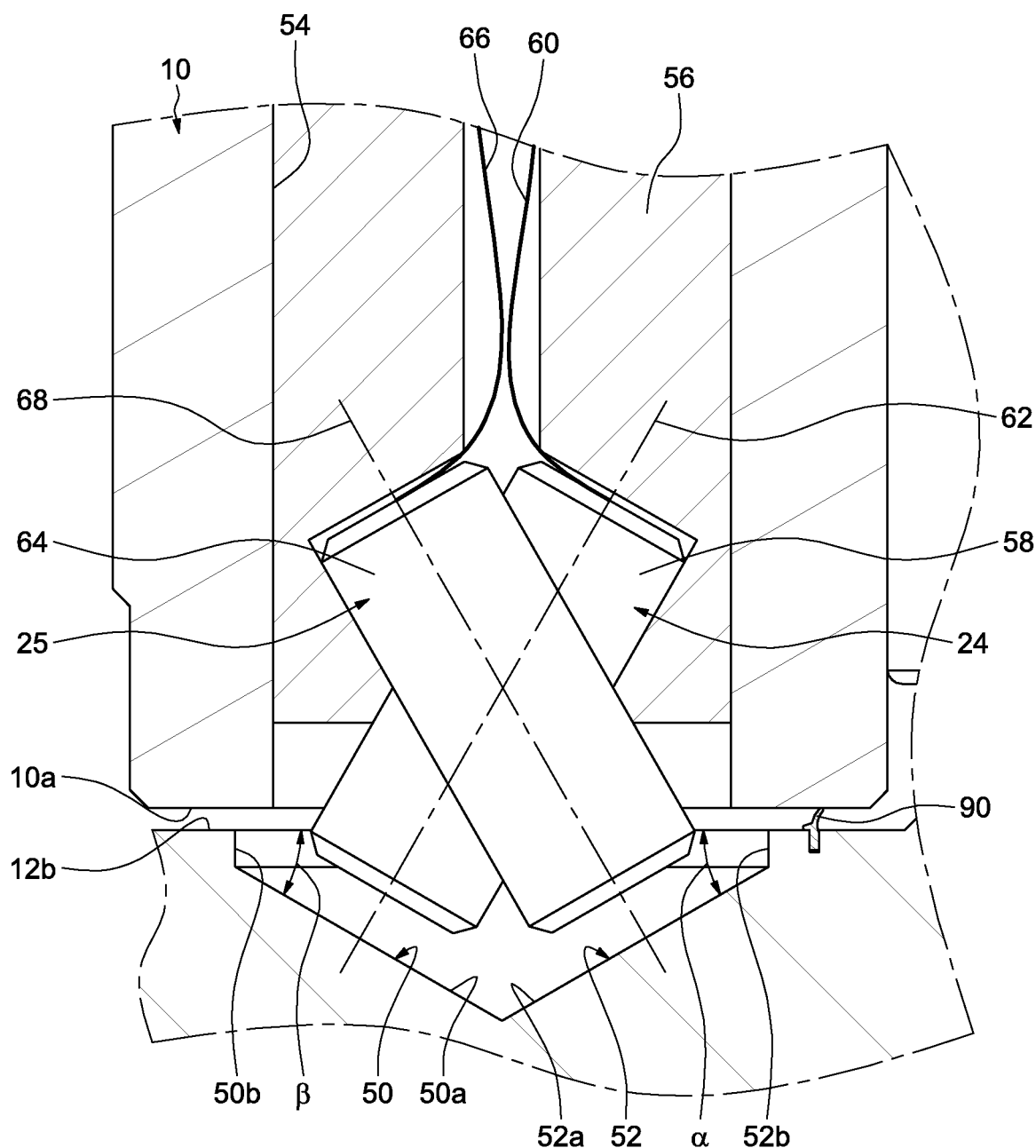
FIG. 2 is a detail view of FIG. 1.

As shown more clearly on FIG. 2, the first groove 50 extends radially inwards from the outer cylindrical surface 12b of the inner ring. The groove 50 comprises an annular tapered portion or wall 50a extending obliquely inwards. The tapered wall 50a has a frustoconical shape. The tapered wall 50a is inclined with respect to the axis X-X' (FIG. 1) of the rolling bearing. In other words, the tapered wall 50a is formed oblique to the axis X-X'. The tapered wall 50a is inclined with respect to the axial cylindrical surface 12b of the inner ring. In a radial plane of the rolling bearing as shown on FIG. 2, a first taper angle β is formed between the tapered wall 50a of the groove and the axial cylindrical surface 12b. For example, the value of the first taper angle β may be preferably comprised between 15° and 30°.

In the illustrated example, the groove 50 is provided with an annular radial side wall 50b extending radially inwards the outer cylindrical surface 12b and from which extends the tapered wall 50a. Alternatively, the groove 50 may be deprived of such side wall 50b. In this case, the tapered wall 50a extends directly from the axial cylindrical surface 12b of the inner ring.

The second groove 52 extends radially inwards from the outer cylindrical surface 12b of the inner ring. In the illustrated example, the second groove 52 extends axially from the first groove 50.

The groove 52 comprises an annular tapered portion or wall 52a extending obliquely inwards. The tapered wall 52a has a frustoconical shape. The tapered wall 52a is inclined with respect to the axis X-X' (FIG. 1) of the rolling bearing. The tapered wall 52a is inclined with respect to the axial cylindrical surface 12b of the inner ring. A second taper angle α is formed between the tapered wall 52a and the axial cylindrical surface 12b. In the illustrated example, the value of this second taper angle α is equal to the value of the first taper angle β formed between the tapered wall 50a of the first groove and the axial cylindrical surface 12b.

In the illustrated example, the second groove 52 is provided with an annular radial side wall 52b extending radially inwards the outer cylindrical surface 12b and from which extends the tapered wall 52a. Alternatively, the groove 52 may be deprived of such side wall 52b. In this case, the tapered wall 52a extends directly from the axial cylindrical surface 12b of the inner ring.

As previously mentioned, in the illustrated example, the second groove 52 extends axially from the first groove 50. Here, the tapered wall 52a of the second groove extends the tapered wall 50a of the second groove. Alternatively, a cylindrical bottom could interconnect the tapered walls 50a, 52a.

From the outer cylindrical surface 12b of the inner ring, the tapered wall 50a of the groove 50 extends obliquely inwards along a first direction and the tapered wall 52a of the groove 52 extends obliquely inwards along a second direction which is opposite to the first direction.

In the illustrated example, from the outer cylindrical surface 12b of the inner ring, the tapered wall 50a extends obliquely towards the frontal surface 12d (FIG. 1) of the inner ring while the tapered wall 52a extends obliquely towards the frontal surface 12c.

In the illustrated example, the tapered wall 52a of the groove 52 is symmetric to the tapered wall 50a of the groove 50 with respect to a radial plane passing through the edge between the walls. More generally, the groove 52 is symmetric to the groove 52 with respect to the radial plane.

The first distance sensor 24 faces the first groove 50. The sensor 24 faces the tapered wall 50a of the groove. The sensor 24 measures distances to the tapered wall 50a. The first distance sensor 25 faces the second groove 52. The sensor 25 faces the tapered wall 52a of the groove. The sensor 25 measures distances to the tapered wall 52a.

Referring once again to FIG. 1, the outer ring 14 is provided with a radial through-hole 54 inside which the first and second distance sensors 24, 25 are located. The through-hole 54 extends from the outer surface 10b of the outer ring and opens on the bore 10a. The through-hole 54 radially faces the first and second grooves 50, 52 of the inner ring.

In the illustrated example, each of the sensor 24, 25 is mounted into the through-hole 54 and protrudes radially into the radial space provided between the outer and inner rings 10, 12. The sensor 24 also protrudes into the first groove 50. The sensor 24 remains spaced apart from the tapered wall 50a of the groove. Similarly, the sensor 25 also protrudes into the second groove 52. The sensor 25 remains spaced apart from the tapered wall 52a of the groove. Alternatively, the sensors 24, 25 may be entirely located inside the through-hole 54.

The outer ring 10 further comprises a casing 56 which closes and seals the through-hole 54. The casing 56 also supports the sensors 24, 25. The sensors 24, 25 are secured to the casing 56 by any appropriate means. The casing 56 is located radially into the through-hole 54. The casing 56 is secured inside the through-hole 54 by any appropriate means, for example by force-fitting. The casing 56 is flush with the outer cylindrical surface 10b of the outer ring.

As shown more clearly on FIG. 2, the first sensor 24 comprises a sensor body 58 mounted inside the casing 56 of the outer ring. The sensor body 58 faces the tapered wall 50a of the first groove. The sensor body 58 protrudes into the groove 50. The sensor body 58 remains spaced apart from the tapered wall 50a.

In the disclosed example, the sensor 24 also comprises an output connecting cable 60 for transmitting sensing data which extends outwards relative to the sensor body 58. The output cable 60 extends radially outwards. The casing 56 is provided with a through-opening (not referenced) wherein the output cable 60 can go through. The output cable 60 connects the sensor 24 to a control unit (not shown) of the rolling bearing so as to transmit sensed measurements. Alternatively, the sensor 24 may be deprived of such output cable in case of a wireless sensor.

The sensor body 58 of the first sensor has a longitudinal axis 62 extending obliquely. The axis 62 also forms the longitudinal axis of the sensor 24. The axis 66 is perpendicular to the tapered wall 50a of the first groove.

The second sensor 25 comprises a sensor body 64 mounted inside the casing 56. The sensor body 64 faces the tapered wall 52a of the second groove. The sensor body 64 protrudes into the groove 52. The sensor body 64 remains spaced apart from the tapered wall 52a.

In the disclosed example, the sensor 25 also comprises an output connecting cable 66 for transmitting sensing data which extends outwards relative to the sensor body 64. The output cable 66 goes through the opening of the casing 56. The output cable 66 connects the sensor 25 to the control unit so as to transmit sensed measurements. Alternatively, the sensor 25 may be deprived of such output cable in case of a wireless sensor.

The sensor body 64 of the second sensor has a longitudinal axis 68 extending obliquely. The axis 68 also forms the longitudinal axis of the sensor 25. The axis 68 is perpendicular to the tapered wall 52a of the second groove.

Each of the sensor 24, 25 may be an inductive distance sensor, or an ultrasonic distance sensor, or an optical distance sensor. Alternatively, each of the sensor 24, 25 may be a mechanical distance sensor provided with a contact stylus. In this last case, the mechanical sensor faces the tapered wall 50a or 52a of the groove but also comes into contact with the tapered wall.

As previously mentioned, the sensor 24 measures distances to the tapered wall 50a of the first groove of the inner ring. The distances are measured along the longitudinal axis 62 of the sensor 24. The sensor 25 measures distances to the tapered wall 52a of the second groove of the inner ring. The distances are measured along the longitudinal axis 68 of the sensor 25.

Figure 3:
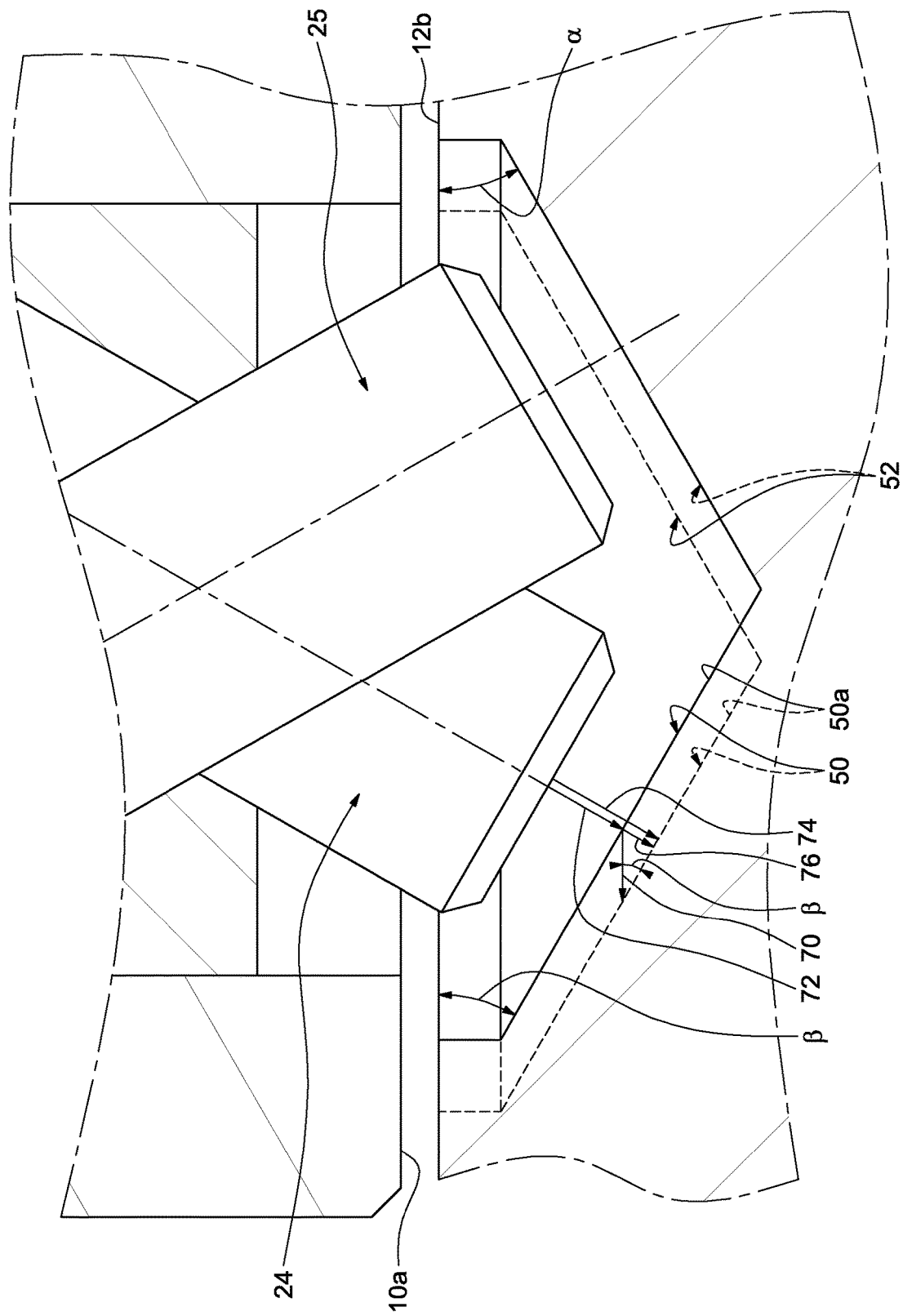
FIG. 3 is a detail view of FIG. 1 illustrating schematically an axial displacement of one ring of the bearing relative to another ring.

A pure axial displacement of the inner ring 12 relative to the outer ring 10 is shown schematically and partially on FIG. 3. The grooves 50, 52 represented in dotted lines illustrate the position of the inner ring 12 after the axial displacement. The axial displacement Da of the inner ring 12 relative to the outer ring 10 is illustrated by the arrow referenced 70.

The arrow referenced 72 illustrates a first distance to the tapered wall 50a of the groove measured by the sensor 24 before the axial displacement of the inner ring 12 relative to the outer ring 10. A second distance to the tapered wall 50a of the groove measured by the sensor 24 after this axial displacement is illustrated by the arrow referenced 74.

The displacement $\Delta M$ of the tapered wall 50a of the groove relative to the outer ring 10, which is detected by the sensor 24, is represented by the arrow referenced 76. The value of the relative displacement $\Delta M$ is equal to the differential measurement of the sensor 24, i.e. the difference between the second and the first distances measured by the sensor 24.

In case of pure axial displacement of the inner ring 12 relative to the outer ring 10 as shown on FIG. 3, the value of the displacement $\Delta M$ of the tapered wall 50a of the groove relative to the outer ring 10 is also equal to:

$\Delta M = Da \times \sin \beta$, where Da is the value of the axial displacement of the inner ring 12 relative to the outer ring 10, and $\beta$ the value of the first tapered angle of the tapered wall 50a of the first groove.

Figure 4:
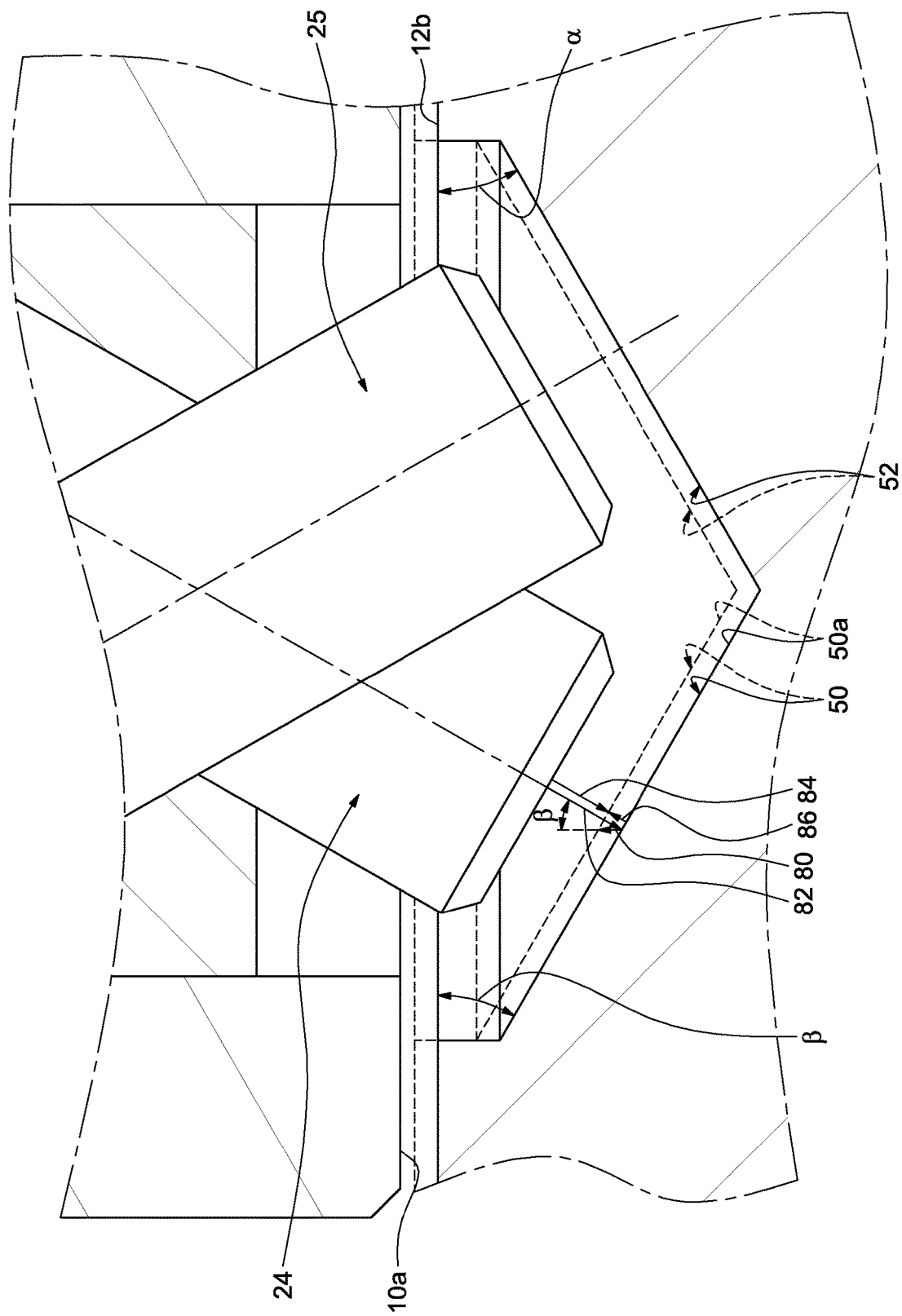
FIG. 4 is a detail view of FIG. 1 illustrating schematically a radial displacement of one ring of the bearing relative to another ring.

A pure radial displacement of the inner ring 12 relative to the outer ring 10 is shown schematically and partially on FIG. 4. The radial displacement Dr of the inner ring 12 relative to the outer ring 10 is illustrated by the arrow referenced 80.

The arrow referenced 82 illustrates a first distance to the tapered wall 50a of the groove measured by the sensor 24 before the radial displacement of the inner ring 12 relative to the outer ring 10. A second distance to the tapered wall 50a of the groove measured by the sensor 24 after this radial displacement is illustrated by the arrow referenced 84.

The displacement $\Delta M$ of the tapered wall 50a of the groove relative to the outer ring 10, which is detected by the sensor 24, is represented by the arrow referenced 86. The value of the relative displacement $\Delta M$ is equal to the differential measurement of the sensor 24.

In case of pure radial displacement of the inner ring 12 relative to the outer ring 10 as shown on FIG. 4, the value of the displacement $\Delta M$ of the tapered wall 50a of the groove relative to the outer ring 10 is also equal to:

$\Delta M = Dr \times \cos \beta$, where Dr is the value of the radial displacement of the inner ring 12 relative to the outer ring 10, and $\beta$ the value of the first tapered angle of the wall 50a of the first groove.

In case of combined axial and radial displacements of the inner ring 12 relative to the outer ring 10 and considering that signals $S_{24}$ emitted by the first sensor 24 are a linear function of the distance measured by this sensor, the differential measurement $\Delta S_{24}$ of the sensor is thus defined by: $\Delta S_{24} = Dr \times \cos \beta + Da \times \sin \beta$.

Similarly, as concern the second sensor 25 facing the tapered wall 52a of the second groove, the differential measurement $\Delta S_{25}$ of this second sensor is defined by $\Delta S_{25} = Dr \times \cos \alpha - Da \times \sin \alpha$, where $\alpha$ is the value of the second tapered angle of the wall 50a of the groove.

As previously mentioned, in the illustrated example, the value of this second taper angle $\alpha$ is equal to the value of the first taper angle $\beta$ formed between the tapered wall 50a of the first groove and the axial cylindrical surface 12b.

Accordingly, in this specific example, the differential measurement $\Delta S_{25}$ of the second sensor 25 is also defined by $\Delta S_{25} = Dr \times \cos \beta - Da \times \sin \beta$.

Therefore, the axial displacement Da and the radial displacement Dr of the inner ring 12 relative to the outer ring 10 are equal to:

$$Da = \frac{(\Delta S_{24} - \Delta S_{25})}{2 \times \sin \beta}$$

$$Dr = \frac{(\Delta S_{24} + \Delta S_{25})}{2 \times \cos \beta}$$

Accordingly, the axial and radial displacement of the inner ring 12 relative to the outer ring 10 can be calculated from the displacements measured by the sensors 24, 25. Advantageously, the control unit of the rolling bearing calculates these axial displacements of the inner ring 12 relative to the outer ring 10.

Referring once again to FIGS. 1 and 2, in the illustrated example, the rolling bearing further comprises an additional seal 90 disposed inside the closed space 46 which is delimited by the seals 42, 44. The seal 90 is axially located near to the seal 42. The seal 90 is axially disposed between the seal 42 and the row of axial rollers 20. In the illustrated example, the seal 90 is mounted into a groove (not referenced) formed on the outer cylindrical surface 12b of the inner ring and comes into contact with the outer ring 10. The seal 90 comes into contact with the bore 10a of the outer ring near to the through-hole 54. Alternatively, the seal 90 may be mounted on the outer ring 14 and come into friction contact with the inner ring 12.

Radially between the outer and inner rings 10 and 12, the seal 90 delimits together with the seal 42 a closed detection space (not referenced) inside which open the first and second grooves 50, 52 of the inner ring and the through-hole 54 of the outer ring. Only the grooves 50, 52, the through-hole 54 and the sensors 24, 25 are located inside the detection space. There is no row of rollers inside the detection space. This reduces the risk that pollution, such as grease, dust, water, reaches the sensors 24, 25.

Figure 5:
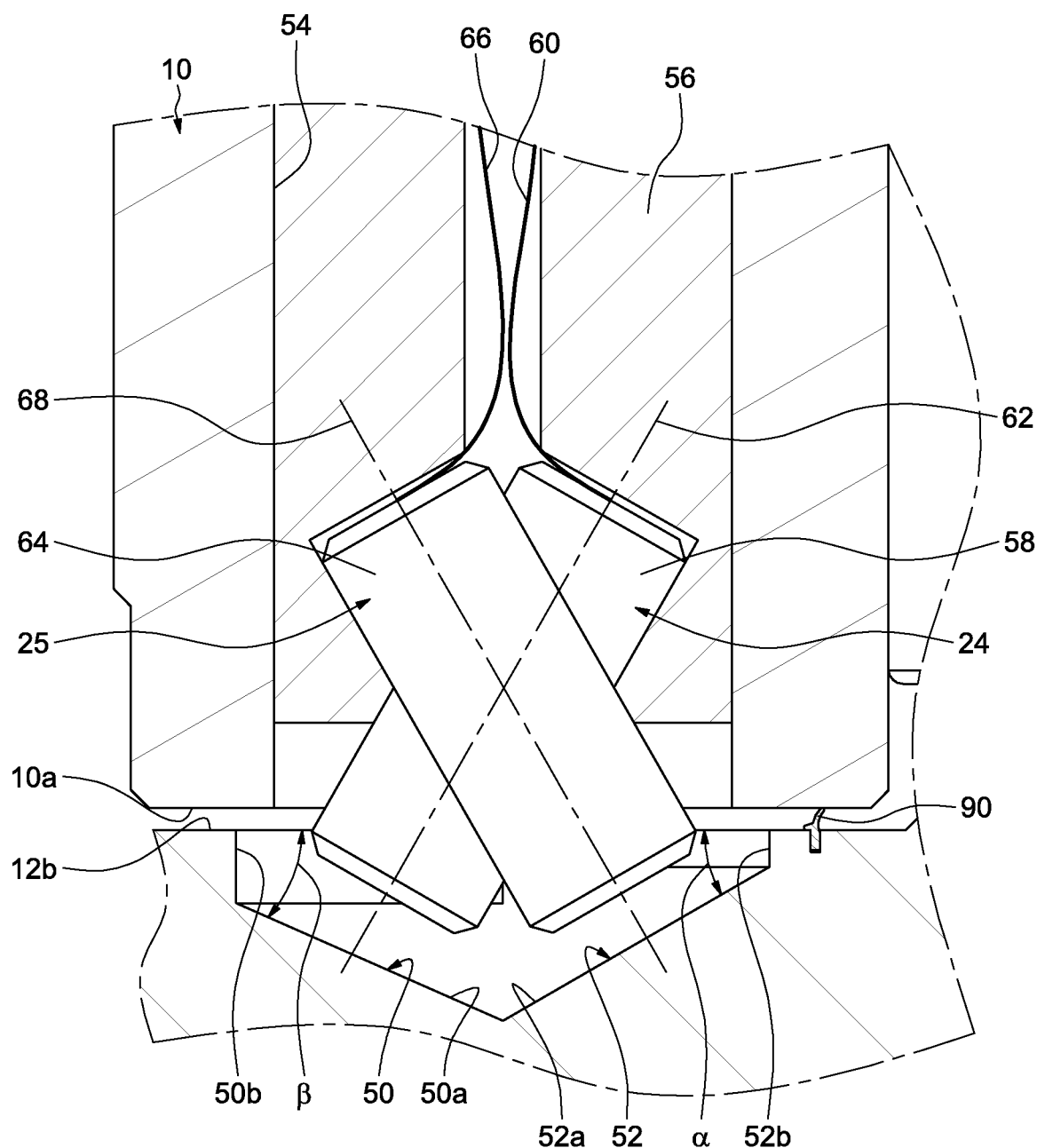
FIG. 5 is a detail view of a rolling bearing according to a second example of the invention.

The example shown on FIG. 5, in which identical parts are given identical references, only differs from the first example in that the value of the first taper angle β, which is formed between the tapered wall 50a of the first groove and the axial cylindrical surface 12b, is different from the value of the second taper angle α formed between the tapered wall 52a of the second groove and the axial cylindrical surface 12b.

Accordingly, in this case, the axial displacement Da and the radial displacement Dr of the inner ring 12 relative to the outer ring 10 are equal to:

$$Da = \frac{(\Delta S_{24} - b \times \Delta S_{25})}{(\sin \beta + b \times \sin \alpha)}$$

$$Dr = \frac{(\Delta S_{24} + a \times \Delta S_{25})}{(\cos \beta + a \times \cos \alpha)}$$

where:

$$a = \frac{\sin \beta}{\sin \alpha} \text{ and } b = \frac{\cos \beta}{\cos \alpha}$$

In the illustrated examples, the tapered grooves 50, 52 are formed on the outer cylindrical surface 12b of the inner ring axially between the row of axial rollers 20 and the seal 42. Alternatively, according to the design of the rolling bearing, it could be possible to provide the grooves 50, 52 on another zone of the outer cylindrical surface 12b, or on the outer cylindrical surface of the nose of the inner ring.

In the illustrated examples, the tapered grooves 50, 52 are connected together. In other words, the second groove 52 extends axially the first groove 50. In another variant, the tapered grooves 50, 52 may be axially spaced one relative to another. The tapered grooves 50, 52 may be provided on the same outer cylindrical surface of the inner ring, or on two distinct axial cylindrical surfaces of the inner ring, for example the outer cylindrical surface 12b and the outer cylindrical surface of the nose of the inner ring.

Otherwise, as previously mentioned, in this illustrated examples, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, each of the tapered groove 50, 52 is formed on the axial inner cylindrical surface of the outer ring, which forms the bore of the outer ring, and the sensors 24, 25 are mounted on the inner ring.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

The invention claimed is:

1. A bearing, comprising:
    a first ring and a second ring capable of rotating concentrically relative to one another, wherein
    at least a first tapered groove and at least a second tapered groove are formed on the second ring and are oriented towards the first ring, the bearing further comprising:
    at least one first distance sensor mounted on the first ring and facing a tapered wall of the first tapered groove of the second ring that is inclined with respect to the axis of the bearing, a longitudinal axis of the first distance sensor being perpendicular to the tapered wall of the first tapered groove, and
    at least one second distance sensor mounted on the first ring and facing a tapered wall of the second tapered groove of the second ring which is inclined with respect to the axis of the bearing, a longitudinal axis of the second distance sensor being perpendicular to the tapered wall of the second tapered groove,
    the tapered walls of the first and second grooves extending obliquely along two opposite directions.

2. The bearing according to claim 1, wherein each of the first and second tapered grooves of the second ring is annular.

3. The bearing according to claim 1, wherein the tapered wall of the second tapered groove is at least partly symmetric to the tapered wall of the first tapered groove with respect to a radial plane of the bearing.

4. The bearing according to claim 1, wherein the second tapered groove extends axially from the first tapered groove.

5. The bearing according to claim 4, wherein the tapered wall of the second tapered groove extends the tapered wall of the first tapered groove.

6. The bearing according to claim 1, wherein the first ring comprises a single through-hole inside which the first and second distance sensors are at least partly disposed.

7. The bearing according to claim 6, further comprising a casing supporting the first and second distance sensors and mounted inside the through-hole of the first ring.

8. The bearing according to claim 1, further comprising a control unit connected to the first and second distance sensors and adapted to calculate the value of a relative axial displacement and a relative radial displacement between the first and second rings on the basis of the formulae:

$$Da = \frac{(\Delta S_{24} - b \times \Delta S_{25})}{(\sin \beta + b \times \sin \alpha)}$$

$$Dr = \frac{(\Delta S_{24} + a \times \Delta S_{25})}{(\cos \beta + a \times \cos \alpha)}$$

where:
    $\Delta S_{24}$ is the value of the differential measurement of the first distance sensor on the tapered wall of the first tapered groove,
    $\Delta S_{25}$ is the value of the differential measurement of the second distance sensor on the tapered wall of the second tapered groove,
    β is the value of a first taper angle of the tapered wall of the first groove,
    α is the value of a second taper angle of the tapered wall (50b) of the second groove, and $$a = \frac{\sin \beta}{\sin \alpha} \text{ and } b = \frac{\cos \beta}{\cos \alpha}.$$

9. The bearing according to claim 1, further comprising at least one row of rolling elements arranged between raceways provided on the first and second rings.

10. The bearing according to claim 1, further comprising at least one row of axial rolling elements arranged between radial raceways provided on the rings, and at least one row of radial rolling elements arranged between axial raceways provided on the rings, the second ring comprising a protruding nose which engages into an annular groove of the first ring and which protrudes radially from an axial cylindrical surface of the second ring, the first and second tapered grooves being formed onto the axial cylindrical surface.

* * * * *